United States Patent [19]

Angwin

[11] Patent Number: 4,942,621

[45] Date of Patent: Jul. 17, 1990

[54] METHOD FOR MAPPING SCANNED PIXEL DATA

[75] Inventor: George T. Angwin, Palo Alto, Calif.

[73] Assignee: MSC Technologies, Inc., Fremont, Calif.

[21] Appl. No.: 271,453

[22] Filed: Nov. 15, 1988

[51] Int. Cl.⁵ .............................................. G06K 9/22
[52] U.S. Cl. ..................................... 382/59; 340/710; 358/474; 382/13
[58] Field of Search ................... 382/13, 59; 178/18; 358/400, 474, 487; 340/706, 710; 250/209, 237 R, 237 G, 221; 356/374, 375

[56] References Cited

U.S. PATENT DOCUMENTS

| | | | |
|---|---|---|---|
| 3,297,879 | 1/1967 | Meyer | 250/237 |
| 3,825,746 | 7/1974 | Kendler et al. | 250/209 |
| 3,957,378 | 5/1976 | Zipin | 356/169 |
| 4,022,969 | 5/1977 | McKinlay et al. | 178/18 |
| 4,074,131 | 2/1978 | Schwebel | 250/237 |
| 4,176,276 | 11/1979 | Kaul et al. | 250/237 |
| 4,260,979 | 4/1981 | Smith | 382/59 |
| 4,303,914 | 12/1981 | Page | 340/706 |
| 4,306,147 | 12/1981 | Fukuyama et al. | 250/221 |
| 4,364,035 | 12/1982 | Kirsch | 340/710 |
| 4,384,204 | 5/1983 | Tamaki et al. | 250/237 |
| 4,390,873 | 6/1983 | Kirsch | 340/710 |
| 4,409,479 | 10/1983 | Sprague et al. | 250/237 |
| 4,465,373 | 8/1984 | Tamaki et al. | 356/374 |
| 4,546,347 | 10/1985 | Kirsch | 340/710 |
| 4,581,761 | 4/1986 | Ichinokawa et al. | 382/13 |
| 4,751,380 | 6/1988 | Victor et al. | 250/221 |
| 4,803,737 | 2/1989 | Sato et al. | 382/59 |
| 4,804,949 | 2/1989 | Faulkerson | 382/59 |
| 4,862,281 | 8/1989 | Sato et al. | 382/59 |
| 4,866,535 | 9/1989 | Kubota et al. | 382/59 |

FOREIGN PATENT DOCUMENTS

54-126426 10/1979 Japan.

Primary Examiner—Leo H. Boudreau

[57] ABSTRACT

A method for using a scanner to scan pixel data from an image on a page and map the scanned pixel data in a computer's memory is disclosed comprising the steps of (a) placing a scanner having an elongated detector array of detector elements and two optical mice located in relation to the ends of the array on a transparent grid pattern covering an image on a page to be scanned, (b) determining the orientation of the scanner with respect to the grid pattern using motion detection information provided by the two mice, (c) positioning the scanner at a starting point from which to start detecting the position of the mice and commencing scanning of the page by moving the scanner across the surface of the grid pattern, and (d) storing pixel data scanned by each detector element at a memory address of a computer in communication with the scanner which corresponds to a coordinate position on the grid pattern determined to be nearest the actual position of a particular detector element.

20 Claims, 10 Drawing Sheets

METHOD FOR MAPPING SCANNED PIXEL DATA

BACKGROUND OF THE INVENTION

1. Field of the Invention

The present invention relates generally to a method for using a scanner to scan pixel data from an image on a page and store the scanned pixel data in the memory of a computer, and more particularly to a method for determining the relative position of the each detector element of a detector array over a grid of pixels, thereby facilitating the accurate mapping of scanned pixel data in the computer's memory.

2. Brief Description of the Prior Art

Position sensors or cursor control devices which determine the relative position of a point on a grid and thereby determine the movement of a cursor on a visual display system, such as a computer screen, are known in the art. One such device is an optical position sensor, commonly called a mouse. As used herein, the term "mouse," or its plural "mice," is used to describe any type of mechanical or optical device capable of detecting its relative motion and/or position over a surface and producing an output signal that can be used to determine the position of a cursor on a computer screen or an address in a computer's memory.

In the typical application, a single electro-optical or elctro-mechanical mouse is used in combination with a computer terminal and a software program which allows the operator to enter instructions for a computer without need of a keyboard. Some prior art devices have combined a single mouse with a detector array, capable of detecting pixel data from a scanned surface, to produce a type of scanning device. These types of scanning devices have typically been used to scan a single line of text at a time or other indicia located at some position on the scanned page. The usefulness of such scanners has generally been limited because the mouse used in such applications can only detect motion in one dimension and cannot relate its position on the scanned page to a cursor position.

Another type of prior art scanner, such as the "SkyS-CAN" Model SCN-101 scanner by Skyworld Technogy, LTD. of Hong Kong, has been utilized to scan a three to four inch wide path of information from a scanned page. However, such scanners are limited because they are also constrained to detecting motion in only one dimension and the recreated images produced by such scanners cannot be combined to form single screens of information, thereby making it impossible to reproduce a standard page of text.

A scanner utilizing two of the above described mice with a detector array is shown in U.S. application Ser. No. 889,130, filed July 23, 1986, now U.S. Pat. No. 4,797,544, which discloses an optical scanner for copying characters on a page and transfering them to the display screen or memory of a computer. Between the scanner and the page is a transparency containing indicia of position, or a grid pattern. The scanner is equipped with an array of photo-sensitive elements for detecting light reflected from the printed characters on the page, but not the transparency. The scanner is also equipped with two optical mice, which are sensitive to light reflected from the transparency and not the page, for determining the position and relative angle of the detector array with respect to the grid pattern.

Each mouse operates as a counter, detecting the number of vertical or horizontal lines crossed on the grid pattern, to determine the position of each mouse with respect to the grid pattern. Although the position of each mouse can be determined, it is also neccessary to determine the exact position of each detector element of the detector array in order to correctly map the scanned data in the memory of the computer. Theoretically, by placing the detector array between the two mice, it is possible to draw a line between the mice and use that line to place the position of each element of the detector array in the memory or display of the computer.

One possible solution for determining where to assign data in the memory of the computer for a straight array of detector elements is to use one of the algorithms typically utilized to determine the coordinates of pixels which lie near a line drawn across a two-dimensional raster grid. These algorithms operate by assigning known coordinates to the ends of the line, determining the slope of the line, and then determining the relative position of the line with respect to the pixels on the grid. The relative position of the line with respect to the grid is determined by making incremental calculations with each step along the line based upon the results of the preceding step.

Bresenham's Line Algorithm is one of the algorithms commonly used to make such calculations because it uses only integer arithmetic and no real variables, thereby eliminating the extra time and hardware required to do arithmetic with real variables. The Bresenham algorithm operates by stepping along the raster grid in the direction of the X-axis, selecting a different pixel coordinate position close to the line for each grid element in the X-axis direction lying below the line segment being mapped. In other words, the Bresenham algorithm calculates a pixel coordinate position for each raster grid element covered by the projection of the line segment onto the X-axis. The algorithm can be referenced to the Y-axis in a manner analogous to the X-axis referencing described hereinabove. In the application to a scanner, the relevant line segment is the array of detectors. Thus, for a detector array having N detector elements, the Bresenham algorithm produces a number of memory assignments equal to N times the cosine of the angle the array makes with the X-axis. But since the scanner detector is sensing data for N pixels and the cosine of an angle is generally less than one, using the Bresenham algorithm in a scanner application is inappropriate because it does not calculate the positions of enough pixels to use the data sensed.

Thus, the problem with using Bresenham's algorithm for determining where to assign scanned data in memory is that when the detector array is alligned at an angle, more memory addresses are selected for storing scanned data than there are corresponding scanned data to be assigned if a proper recreated image is to be produced by the scanner. Since data collected from different positions on the scanned page are always assigned to discrete locations in memory in accordance with this algorithm, scanners using this algorithm to assign scanned data when scanning any line on a page, which was neither parallel nor perpendicular to the vertical or horizontal axis of the page, would recreate an image of the line which is longer than the length of the line actually scanned.

A second type of dual mouse scanner is described in Ichinokawa et al, U.S. Pat. No. 4,581,761, issued Apr. 8, 1986, which shows an image scanner which is randomly movable over the surface of a sheet of paper, which is in turn laying over a pad having magnetostrictive properties. The pad is operative to be subjected to pulses introduced at two adjacent ends of the pad (one end representing the vertical axis and the other end representing the horizontal axis) which cause the magnetostrictive material of the pad to produce wave like disturbances in the surface of the pad which travel in vertical and horizontal directions. The position sensors have the ability to detect the raised portion of the pad when a wave passes thereunder and the ability to determine the position of each sensor with respect to the pad by extrapolating the amount of time required for a wave to reach a position sensor from where it started.

Unlike the absolute position mice described in Ichinokawa et al, optical mice are relative positioning devices which are typically unable to determine their position with respect to the grid pattern unless they are first oriented and initialized before they start counting lines of the grid pattern. Hence, proficient methods must be determined for properly orienting, initializing, and assigning scanned data to memory addresses for the type of dual optical mouse scanner described above.

LIST OF OBJECTIVES

It is therefore a primary objective of the present invention to provide a method for using a dual mouse optical scanner to scan pixel data from an image on a page and properly assign the scanned data to appropriate computer memory addresses so as to facilitate accurate recreation of the scanned image.

Another objective of the present invention is to provide a method for assigning information collected by N detector elements to precisely N, not necessarily different, positions in memory regardless of the angle formed by the detector array with the X-axis.

Another objective of the present invention is to provide a method for determing the relative position of a dual mouse optical scanner with respect to a grid pattern over which it is moved.

These and other objectives and advantages of the present invention will no doubt become apparent to those skilled in the art after having read the following detailed description of the preferred embodiment which are contained in and illustrated by the various drawing figures.

SUMMARY OF THE PRESENT INVENTION

Briefly, a preferred embodiment of the present invention comprises the steps of (a) placing a scanner having an elongated detector array of detector elements and two optical mice located in relation to the ends of the array on a transparent grid pattern covering an image on a page to be scanned, (b) determining the orientation of the scanner with respect to the grid pattern using motion detection information provided by the two mice, (c) positioning the scanner at a starting point from which to start detecting the position of the mice and commencing scanning of the page by moving the scanner across the surface of the grid pattern, and (d) storing pixel data scanned by each detector element at a memory address of a computer in communication with the scanner which corresponds to a coordinate position on the grid pattern determined to be nearest to the actual position of a particular detector element.

DETAILED DESCRIPTION OF THE PREFERRED EMBODIMENT

Figure 1:
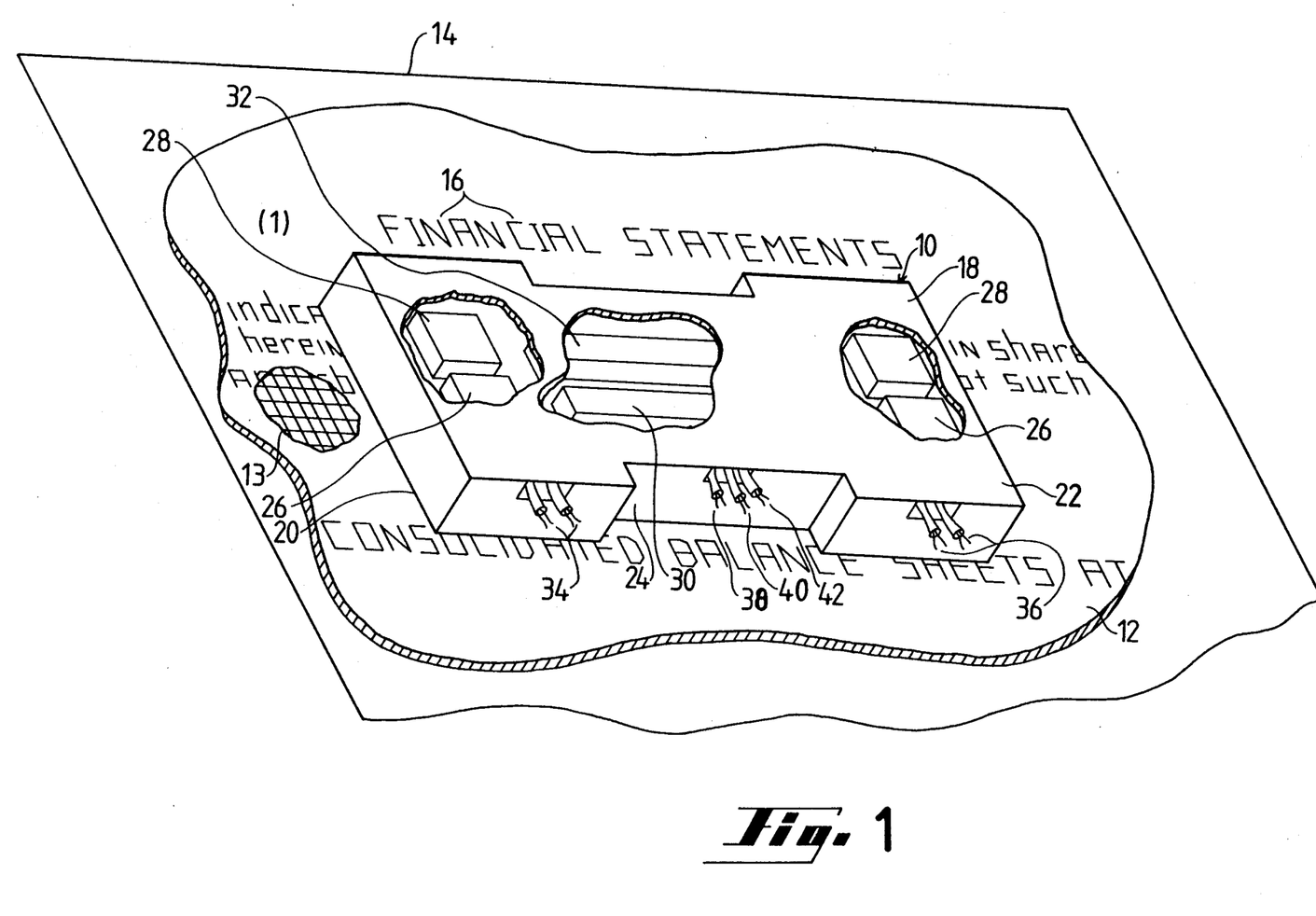
FIG. 1 is a perspective plan view of a scanner having a detector array and two position sensors in accordance with the preferred embodiment of the present invention.

FIG. 1 is perspective plan view of a scanner having a detector array and two position sensors in accordance with the preferred embodiment of the present invention. The scanner 10 is shown placed upon a transparency 12 having a grid pattern 13 thereon, which is in turn placed over a sheet of paper 14 from which printed information 16, of pixel data, is to be scanned. Scanner 10 is comprised of a housing 18, containing two position sensor sections 20 and 22 and a scanning array section 24.

Each position sensor 20 contains a light source 26 and a detector 28. The scanning array section 24 contains a light source array 30 and a detector array 32. Two sets of wires 34 and 36, which communicate position and motion information to a computer (not shown), pass from position sensor sections 20 and 22 respectively. Likewise, data lines 38, timing line 40, and end of signal line 42 communicate information from light source array 30 and detector array 32 to various components of the computer (not shown, but described below).

The housing 18 should fit into the palm of the hand of the operator and be smoothly moveable over the surface of the transparency 12. The light sources 26 and 30 may be light emitting diodes, incandescent bulbs or other broadband illumination sources, and may emit ultraviolet and infrared light, as well as visible light. Alternatively, the light sources 26 and 30 may be lasers, such as a diode laser. The detectors 28 and 32 can be comprised of any of a number of light sensitive devices, such as photodetectors or CCD's. Generally, the light sources and detectors should be arranged so as to illuminate a portion of the grid pattern 13 or page 14 and reflect that light onto one of the detectors in sufficient magnification so as to reduce optical errors.

The transparency 12 can be made from any of a number of materials, such as mylar or plastic, and have the grid pattern 13 printed, dyed or formed on one of its surfaces. The lines forming grid pattern 13 are preferably comprised of a material which is transparent to visible light, but not ultraviolet or infrared light. Thus, if the light source array 30 transmits and the detector array 32 only detects visible light, but light source 26 only transmits and the detector 28 only detects nonvisible light, then the mice will only detect information regarding the position of the scanner and the scanning array will only detect pixel data from the page being scanned.

Figure 2:
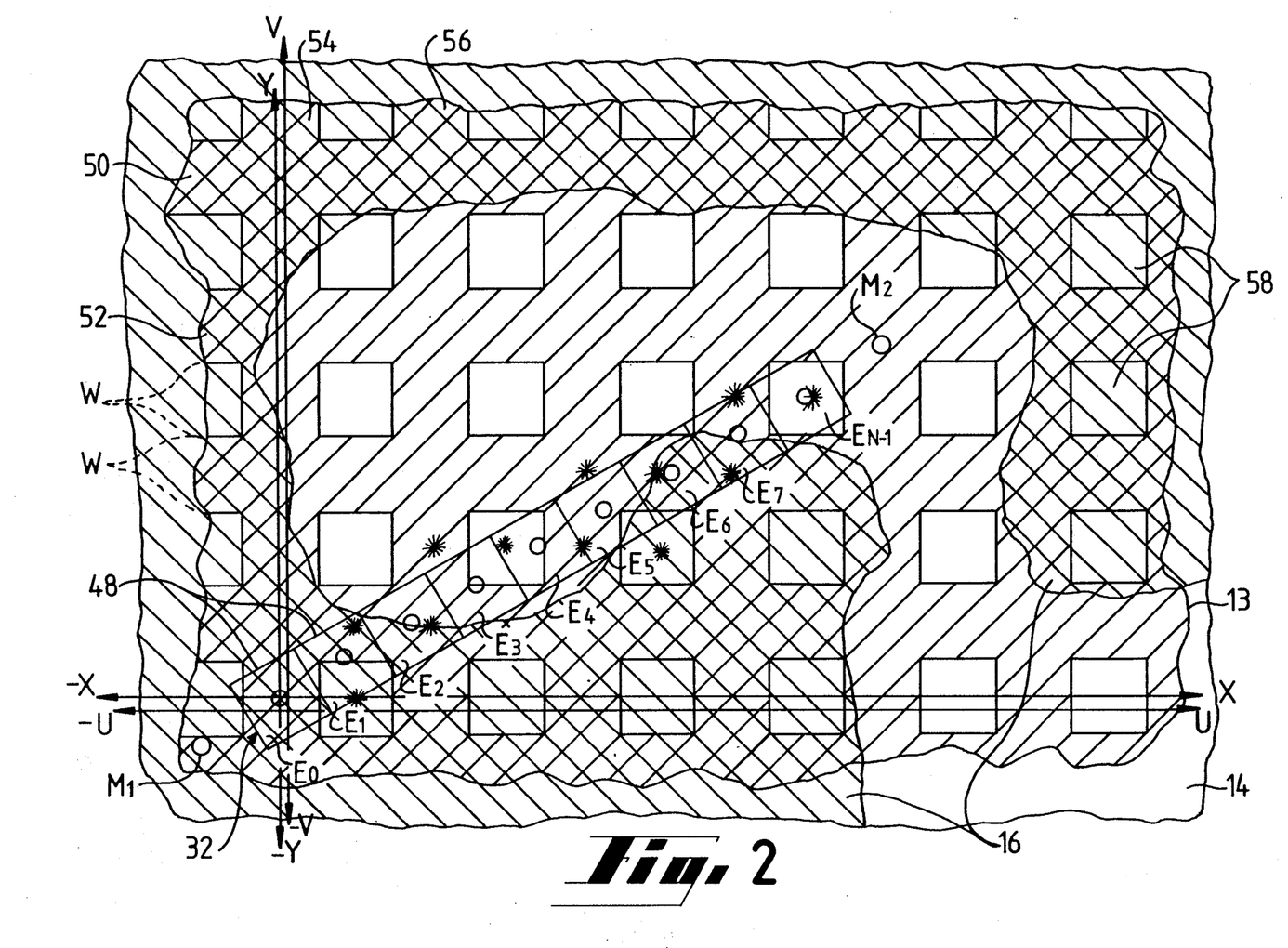
FIG. 2 is a plan view graphically illustrating the relationship between the scanner and the electronic representation of the grid pattern.

FIG. 2 illustrates the relative size of the elements 48 of the detector array 32 with respect to electronic representations of the grid pattern 13 and the printed information 16 of page 14. Two mouse points, $M_1$ and $M_2$, which represent relative position indicators for the mice of the scanner, are shown in their approximate positions with respect to the detector array 32. The electronic grid pattern 13 is made up of two intersecting orthogonal sets of grid lines, including horizontal lines 50 and 52 and vertical grid lines 54 and 56, with spaces 58 defined therebetween.

Electronic grid pattern 13 is referred to as being "electronic" because FIG. 2 only depicts the magnified image of the grid pattern and data in relation to the detector elements 48, rather than the actual physical size of the grid pattern and underlying data. Each set of grid lines is made up of parallel uniformly spaced grid lines, forming uniformly sized spaces of approximately equal line width therebetween. Thus, the grid lines 50-56, and the spaces 58, have approximately the same line width, W. A pixel is defined by any area within a space or grid line having sides of W, such as a space or square portion of a line. Typically, there are 200 grid lines per inch of grid pattern, thus one square inch of grid pattern will be 400 pixels long by 400 pixels wide. The actual physical size of grid pattern 13 and data 16 are approximately one-fourth the size depicted in FIG. 2, but the magnification effect could be greater or smaller depending on the size of the detector elements and grid pattern utilized. Likewise, other line widths may be used and the grid pattern need not form square spaces, although square spaces are easier to handle for computer purposes.

The elements 48 of the detector array 32 are approximately the size of an electronic pixel of the grid pattern. There are about 400 elements 48 per inch of detector array 32, which is typically two to three inches in length. There would typically be as many as 1024 detector elements 48 in the typical detector array 32, although only nine such elements, labeled 0 through N−1 (at the bottom of each element) are shown in FIG. 2, and not necessarily all detector elements are utilized by the scanner. The detector array 32 can be moved in any direction relative to the grid pattern 13 and the X-Y coordinate axes. The relatively small size of the pixels and the elements 48 of the detector array 32 can be further shown by the printed information 16 shown in FIG. 2, which forms a portion of the "F" in the word "Financial," depicted in FIG. 1.

Each element 0 through N−1 has its center marked with a "o." A number of neighboring pixels have their centers marked with an "*." Although the X-Y coordinate system is oriented to have its Y-axis lying along grid line 54 and its origin corresponding to the center of element 0 and one pixel, the X-Y coordinate system can be oriented at any position on the grid pattern 13. The reasoning behind placing the X-Y coordinate system and the U-V coordinate system at the positions shown in FIG. 2 will be explained below with respect to FIGS. 3–9.

Figure 3:
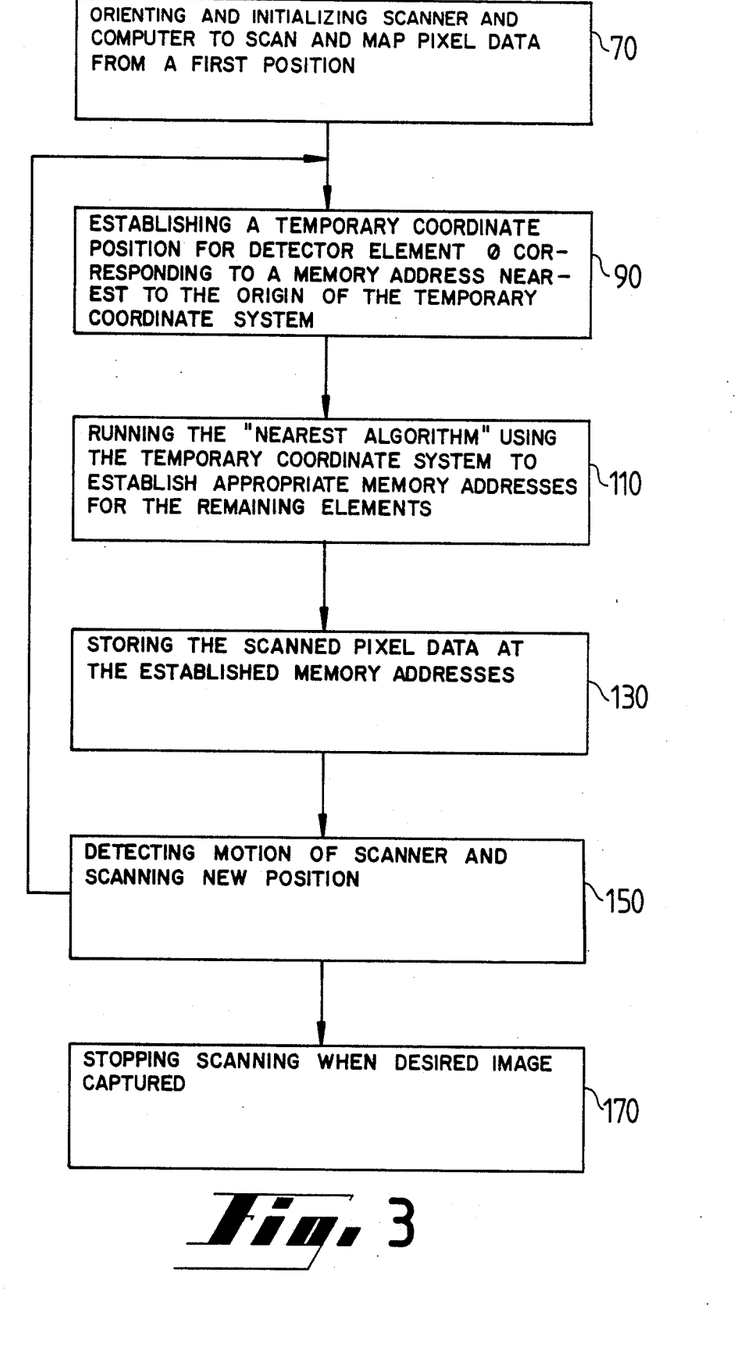
FIG. 3 is a flow diagram depicting the process of scanning pixel data from a page and communicating the scanned pixel data to appropriate computer memory addresses in accordance with the preferred embodiment of the present invention.

FIG. 3 is a flow diagram depicting the process of scanning pixel data 16 from the page 14 and communicating the scanned pixel data to appropriate computer memory positions so as to facilitate the accurate recreation of the scanned image. In the step 70, the scanner 10 is oriented with respect to the grid pattern 13 so that it can detect motion of the scanner and determine its relative position on the grid pattern 13. The scanner 10 and the computer are then initialized to start scanning from a selected first position from which pixel data will be scanned and mapped into the computer's memory. Typically, this first position is wherever the scanner is located after initialization, but can be a specifically selected position if desired.

In the step 90, a temporary coordinate position is established for the data collected by detector element 0 in preparation for running the "nearest algorithm," (further described below) which is utilized to determine the memory locations at which pixel data should be stored for each element so as to accurately recreate the scanned image. The "nearest algorithm" is an algorithm which operates by determining the one coordinate position, or memory address, which is mathematically nearest to the center of a particular detector element 48, rather than selecting a different coordinate position for each step taken by the image in either the X-axis or Y-axis direction. Hence, the "nearest algorithm" may select the same coordinate position twice for different detector elements because both detector elements are calculated to be closer to that one position than any other coordinate position.

The actual position of each element in the detector array 32 can be calculated by determining the position of either mouse M1 or M2 and determining the angle formed by the detector array 32 with either axis of the X-Y coordinate system. Other information regarding the length of the detector array and the distance from either end of the detector array to one of the mice is determined for each scanner and input as a constant value. It should be noted that each mouse need not be linear to the detector array 32 and may be placed at any position, provided the distance from a mouse to an end of the detector array can be determined and input as a constant value. From the above information, the "nearest algorithm" can be utilized to calculate the coordinate position of pixels on the grid pattern which are nearest the center of detector elements in the detector array.

Typically, only integers should be utilized as inputs to the "nearest algorithm" if speedy (or in some situations, accurate) coordinate position determinations are to be made. For example, if element 0 was to be aligned directly over the center of a pixel, its coordinate position would be represented in integer values, and the pixel data detected by element 0 could be easily stored at a memory address which directly corresponds to the position of element 0. However, because the detector array will seldomly be situated so that any of the elements are aligned directly over integer coordinate positions, the actual coordinate positions of the elements cannot be used because there would be no directly corresponding memory addresses. Thus, it is generally necessary to replace the actual noninteger coordinate positions for each pixel in the range of the detector elements of the array with temporary integer coordinate positions which may then be utilized in the "nearest algorithm" to determine the best memory addresses at which to record data.

To thoroughly describe how the "nearest algorithm" operates, it is necessary to work through the process of assigning temporary coordinate positions for the detector elements and determining the nearest corresponding memory address for each element through the various calculations of the nearest algorithm, as will be further described below. In practice, however, it is not necessary or practical to carry out such a process because some or all of the computations which are normally required can be reduced to look-up table routines which significantly increase the speed at which memory address assignments can be made, and thereby removes any need to establish temporary coordinate positions for the detector elements, other than element 0, or carry out lengthy non-integer calculations. Thus, if the coordinate positions of elements 0 and $N-1$ are known, then all computations relating to those figures could be determined by simply looking at a table comprised of all of the possible positions for those two elements.

Likewise, all of the pixel assignments for an entire array of elements could be reduced to a look-up table, as long as the position of one element and the angle formed by the array with the X-axis was known. If the host computing system was equipped with a large quantity of memory, look-up tables could even be established to correspond to the non-integer coordinate positions of element 0 on the grid pattern. Since most computers do not have so much available memory, a temporary reference value can be assigned to element 0 which corresponds to an integer value that is more easily represented by an array of look-up tables. By determining the angle formed by the array with the X-axis, the position of each remaining element in the array may be easily calculated from the look-up table. As quickly as a position for each element can be determined, a nearest memory address may be established for the data collected by that element.

Since the relative degree of visual error established by converting non-integer values to integer values is not significant (due to the extremely small size of the the pixels and detector elements with respect to the scanned image), it is generally not necessary to correct the established positions determined by the nearest algorithm by the difference between the actual position of element 0 and a corresponding temporary reference position, although this may also be done if desired. In many situations it may not even be necessary to set up tables for every angle formed by the detector array with the X-axis, rather 2-3 degree increments may be sufficient. If the host computer's operating speed is below that necessary to calculate memory addresses for an entire array before a new position of the array is established, it may be necessary to use a parallel processing scheme to help speed up the host computer. If parallel processing is not available, it may be necessary to resort to actually calculating the nearest algorithm as described below.

When establishing values for the look-up tables or when otherwise utilizing the "nearest algorithm," a temporary X-Y coordinate system with an origin at the center of detector element 0, shown in FIG. 2 as the X-Y coordinate system, is established for the area of the grid pattern in the range of the detector array, which in FIG. 2 is the first quadrant of the X-Y coordinate system.

To further prevent actual usage of the "nearest algorithm" to determine non-positive integer coordinate positions, a reference coordinate system is utilized to determine approximate temporary coordinate positions for the detector elements in route to establishing nearest memory addresses, as will be further explained below. In FIG. 2, the reference coordinate system is shown as the U-V coordinate system. The U-V coordinate system need not be placed exactly at the center of element 0 like the temporary X-Y coordinate system, and may be located up to one half (0.5) of a line width from the origin of the X-Y coordinate system.

Since the origin of the temporary coordinate system established at element 0 is a known location, the pixel data collected by element 0 may be directly assigned a memory address. And, once pixel data from element 0 has been assigned to an appropriate temporary X-Y coordinate position, temporary X-Y coordinate position assignments and corresponding memory addresses can be established for the remainder of the elements, as is shown by the step 110. If a look-up table is utilized in place of the inprocess operation of the "nearest algorithm," the step 110 would be replaced by the step of establishing appropriate memory addresses with a look-up table. Otherwise, in the step 110, the "nearest algorithm" is executed for each of the temporary X-Y coordinate positions determined for the detector elements. Either way, the scanned pixel data is then stored in the appropriate, established memory addresses as shown by the step 130.

When the scanner 10 has moved to a different position, steps 90 through 130 are repeated, which is shown in step 150. This loop would then be repeated for each detector element in the array for each new position of the scanner 10 until the image has been scanned or the operator desires to stop, as is shown in step 170. Throughout this process, each mouse M1 and M2 are both communicating motion information and position information to the computer.

Motion information and position information are derived from the same basic signal. Quadrature signals output by the mice can be utilized to determine the existence of motion and the direction of that motion. When the scanner has not been initialized, only the sense of motion of the scanner is important. Once the scanner has been initialized, the quadrature signals (as discussed in U.S. application Ser. No. 889,130, now U.S. Pat. No. 4,797,544, described above) can be used to indicate the position of the scanner over the grid pattern 13 and as an input for the "nearest algorithm", and for which motion information is irrelevant. However, motion information is still important because it can be used to indicate a change in position of the scanner, which initiates the loop of step 150 for determining the coordinate positions of the elements. Typically, a change in position which initiates the loop of step 150 occurs when either mouse M1 or M2 detects that a line or space has been crossed. Since this may result in the same calculation being done twice, such as when the scanner is moving approximately parallel to one axis, only line or space crossings separated by a predetermined period of time are utilized to determine when a change in position has occurred.

Figure 4:
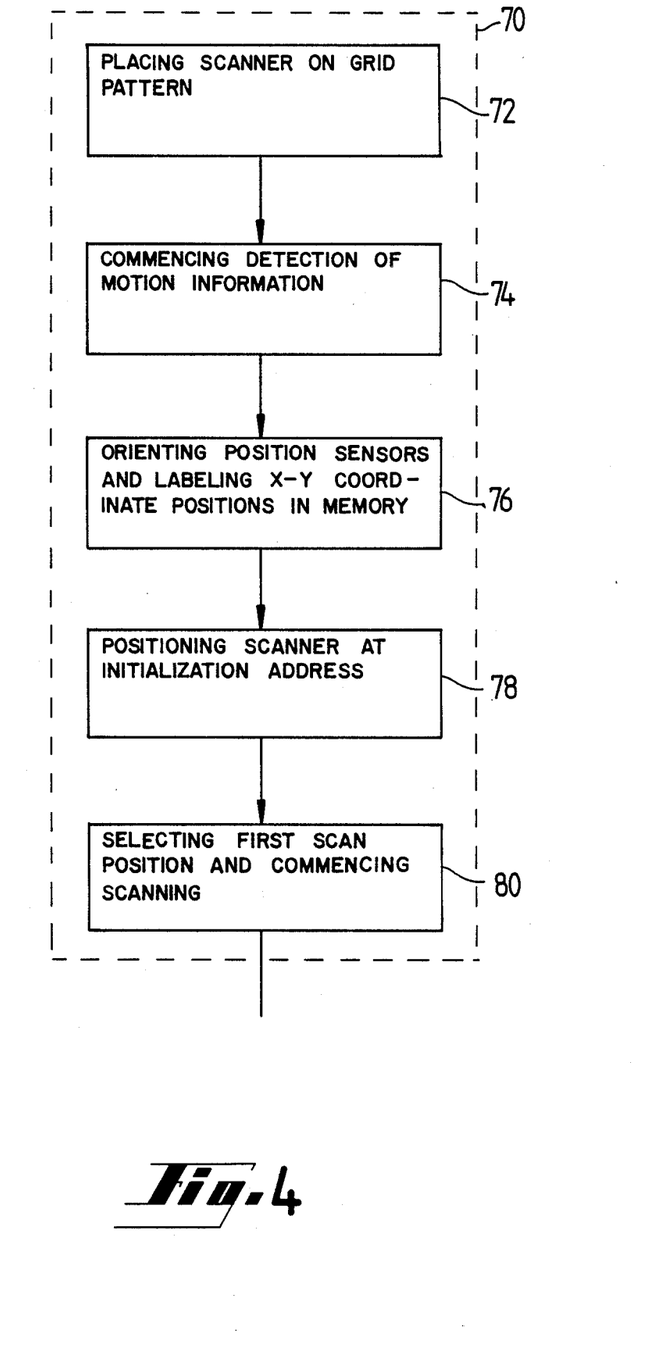
FIG. 4 is a flow diagram further illustrating the process of orienting and initializing the scanner and computer to scan and map from a known first position in accordance with the preferred embodiment of the present invention.

FIG. 4 is a flow diagram further illustrating the step 70 as shown in FIG. 3. In step 72, the scanner 10 is placed on the visually transparent grid pattern 13. Motion detection is then commenced by each mouse in step 74. A mouse can be operated to begin motion detection either remotely, through communication wires 34 or 36, or through a manual switch located somewhere on the housing 18, which is operative to send an operation signal to the mouse when depressed or released.

After commencing motion detection, the scanner is then oriented to the X-Y coordinate system of the grid pattern as shown by step 76. Orientation of the scanner can be accomplished through a program installed in the computer which uses the motion information of the scanner to determine the scanner's position with respect to either the X or Y-axis. By moving the scanner over the surface of the grid pattern 13 in a predetermined manner, the computer will be able to discern the rows and columns of pixels in the grid pattern. The computer will then assign either the X or Y-axis to one of the rows and organize its memory banks in accordance with the orientation of the mice.

The oriented scanner is still unable to determine its position with regard to any fixed point on the grid pattern until it is instructed to start counting line or space crossings from a certain point. In step 78, the scanner is moved to a certain position on the grid pattern which corresponds to an initialization point for the memory of the computer. The initialization point may be any point on the grid pattern. When the initialization point is reached, a signal from the computer or a manual switch on the scanner commences position detection by the mice, which count each line or space crossing to determine the position of the mice, and thereby the scanner, over the grid pattern. Position detection will be disrupted by lifting the scanner off the surface of the grid pattern past the point of vision for the mice or upon signal from the computer or manual switch.

Scanning may be commenced from the initialization point. A signal from the computer or a manual switch on the scanner indicates when scanning is to be commenced. Step 80 illustrates the selection of a first scan position, which can be any point on the grid pattern because the scanner is tracking its position from the initialization point and can start mapping to memory from one point as well as another. Disruption of position detection will likewise disrupt scanning, so that whatever portion of the image that has been scanned may be preserved.

Figure 5:
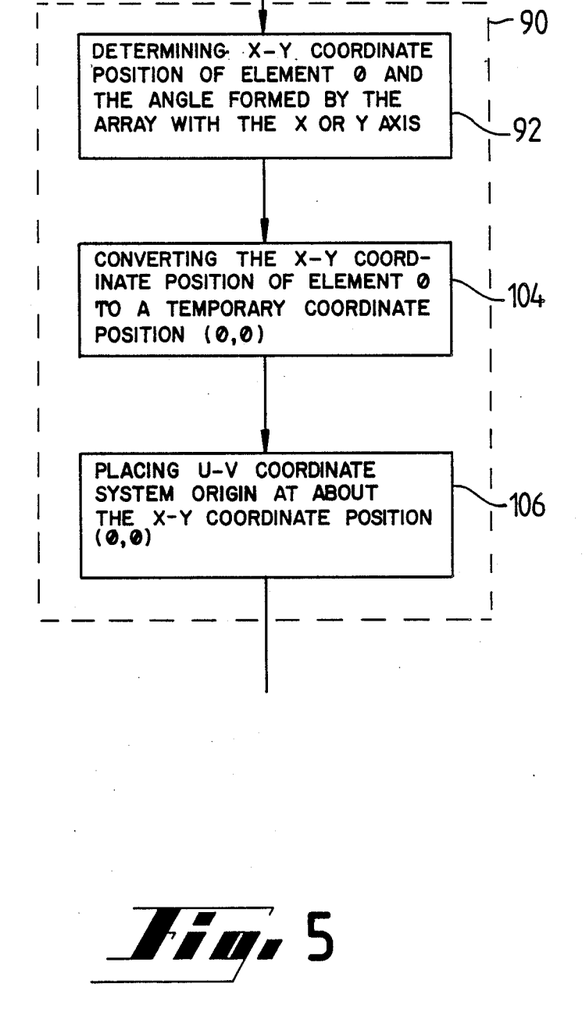
FIG. 5 is a flow diagram further illustrating the process of determining a memory addresses at which to store scanned pixel data from a first detector element.

FIG. 5 is a flow diagram further illustrating the process of establishing a temporary coordinate position for detector element 0, as shown in step 90 of FIG. 3. In step 92, the X-Y coordinate position of element 0 is determined by determining the position of the mice from the element and calculating the differential position. Once the position of an endpoint of a line (the detector array 32) is known from two different positions, it is possible to determine the angle formed by that line with either of the axes of the coordinate system within which it is positioned. The need for determining the angle formed by the detector array 32 with either the X or Y-axis will be further explained below.

In step 104, the actual X-Y coordinate position of element 0 is converted to a temporary X-Y coordinate position (0,0), regardless of where element 0 may be situated on the grid pattern. If desired, a temporary memory position in the computer can be established which corresponds to the temporary X-Y coordinate position and which can be made available for use when a backup in processing occurs. However, such a process should not be necessary if the host computer is able to calculate memory addresses from the temporary coordinate positions at a sufficient rate. Once a temporary coordinate position has been established for element 0, the U-V coordinate system, which need not be directly transposed over the temporary X-Y coordinate system, can be oriented about at the center of element 0, as is shown in step 106.

Figure 6:
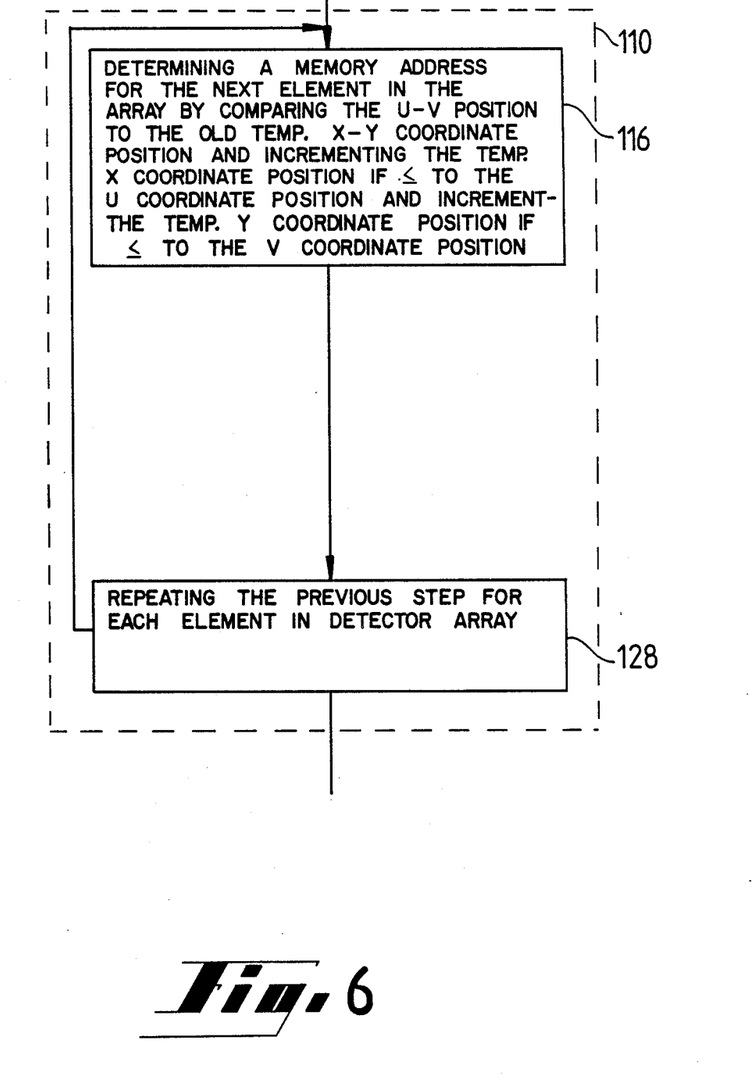
FIG. 6 is a flow diagram further illustrating the process of running the "nearest algorithm" for the remaining elements in the detector array and mapping their positions in memory.

In FIG. 6, a flow diagram is shown further illustrating the process of running the "nearest algorithm" for the remaining elements in the detector array and establishing appropriate memory addresses, as shown in step 110 of FIG. 3. Step 116 illustrates that it is first assumed that the temporary X-Y coordinate position of the next element is the same as the prior element and that a new memory address for the next element in the detector array is only required if a significant change in position has occurred. The need to assign a new memory address to the next element can be determined by comparing the U-V coordinate position of that element to the X-Y coordinate position of the previous element, which in this case was element 0. The process of determining the U-V coordinate position of an element other than element 0 will be described below.

To compare the U-V coordinate position of one element to the temporary X-Y coordinate position of a previous element, the temporary X coordinate position is compared to the U coordinate position and the temporary Y coordinate position is compared to the V coordinate position. If the temporary X coordinate position is less than or equal to the U coordinate position, then the temporary X coordinate position is incremented by one position. If the temporary Y coordinate position is less than or equal to the V coordinate position, then the temporary Y coordinate position is incremented by one position.

As a new temporary X-Y coordinate position is determined for each element in the detector array, the pixel data detected by that element during the predetermined detection period is stored in a corresponding memory address in the computer. Thus, in step 128, the step 116 is consecutively repeated for each next element in the detector array while pixel data collected by the previous element is stored in an appropriate memory address as shown the the step 130.

Figure 7:
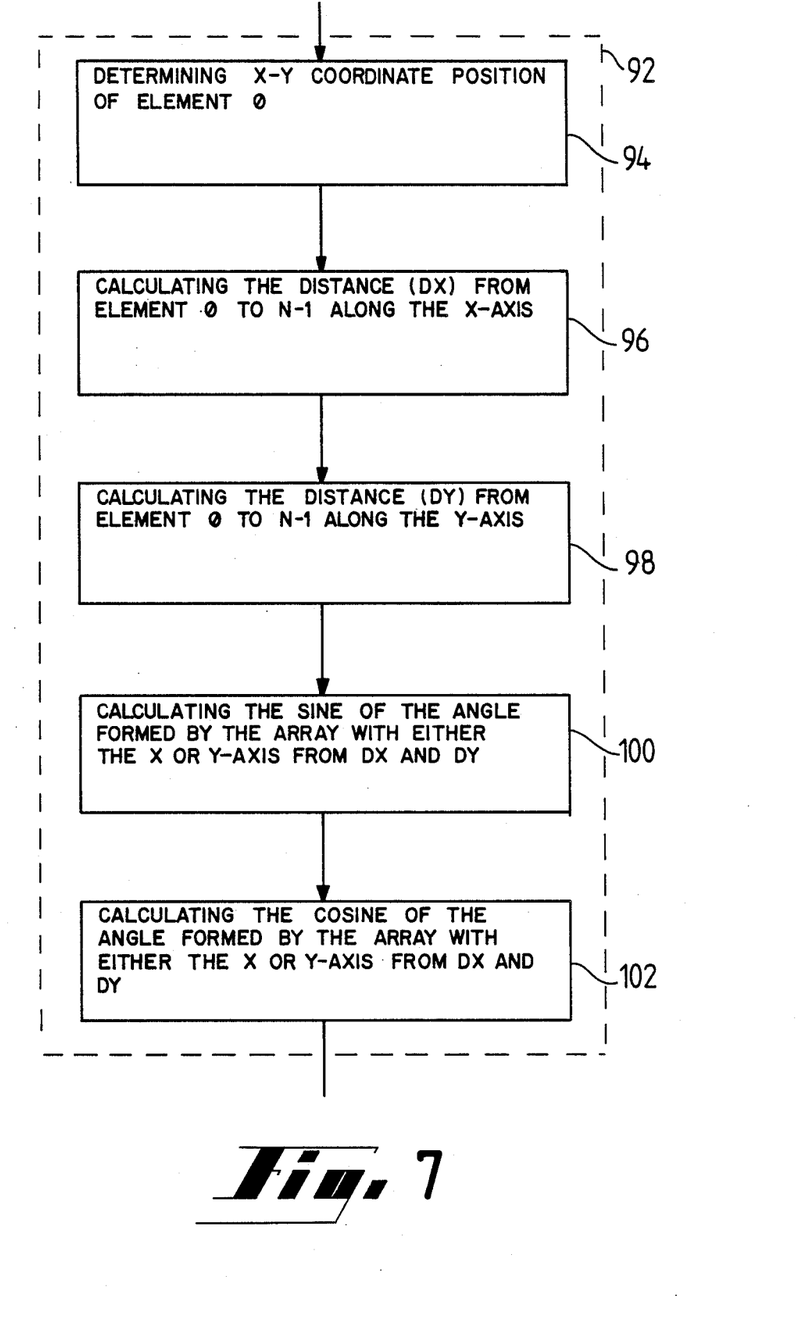
FIG. 7 is a flow diagram further illustrating the process of determining the X-Y coordinate positions of the elements 0 and N−1 and the angle formed by the detector array with the X or Y-axis.

A flow diagram further illustrating the process of determining the X-Y coordinate positions of the element 0 and the angle formed by the detector array with the X or Y-axis described in step 92 of FIG. 5 is shown in FIG. 7. In step 94, the X-Y coordinate position of element 0 is determined as described above. The distance (DX) from element 0 to element N−1 projected along the X-axis is then calculated as shown by step 96. Step 98, likewise illustrates the calculation of the distance (DY) from element 0 to element N−1 projected along the Y-axis.

The angle formed by the detector array with either the X or Y-axis and its sine and cosine are determined in steps 100 and 102 respectively. Since it is the sine and cosine of the angle that are really needed as inputs for operating the "nearest algorithm", the angle need not ever be actually calculated, in that the sine and cosine can be calculated from the values of DY and DX. The sine of the angle (S) can be determined in accordance with the following equation:

$$S = \frac{DX}{\sqrt{DX^2 + DY^2}}$$

Likewise, the cosine of the angle (C) can be determined by the equation:

$$C = \frac{DY}{\sqrt{DX^2 + DY^2}}$$

It should be noted that although the values DX and DY are ever changing with the position of the scanner, the value of the sqrt($DX^2+DY^2$) represents the actual physical length of the array and is static. Thus, this value may be calculated before the first use of the scanner by a consumer and input into ROM or other memory of the computer by the manufacturer to be reused whenever needed.

Figure 8:
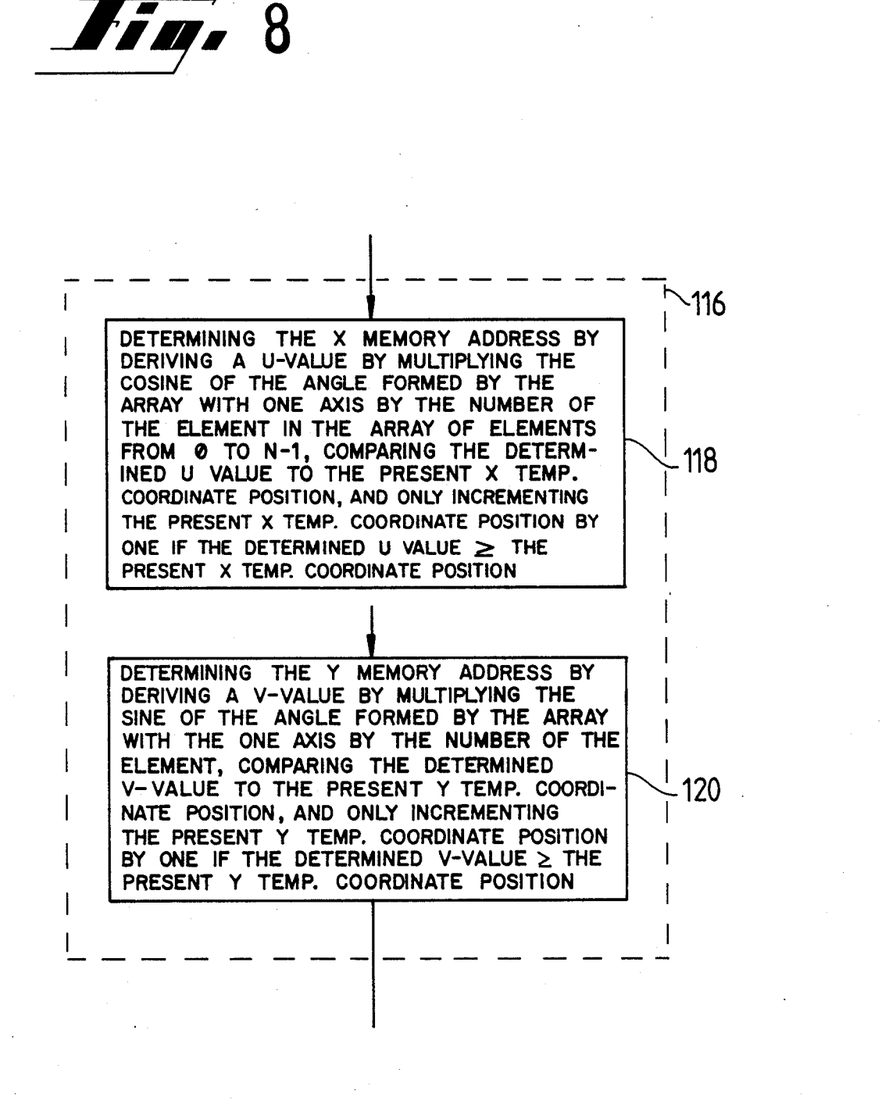
FIG. 8 is a flow diagram further illustrating the process of determining the next temporary address at which to store pixel data detected by the next adjacent detector element in the detector array.

After values have been determined for S and C and the origin of the U-V coordinate system has been established, U-V coordinate positions can be determined for use in step 110, which is further illustrate in FIG. 8. The U-V coordinate position for element 0 is within ($\pm 0.5, \pm 0.5$) of corresponding to the temporary X-Y coordinate position of element 0 (0,0). From the U-V coordinate position of element 0, the U coordinate position of the next adjacent element can be determined according to the following equation:

NEXT $U$=LAST $U+C$ where NEXT U will be the U coordinate position for that element and LAST U is the U coordinate position of the previous element. Assuming the U-V coordinate position of element 0 is (0,0), then NEXT U for element 1 would be equal to C, or C times 1 (the number of the element in the detector array for which NEXT U is being determined), as is shown in step 118 of FIG. 8. Likewise, NEXT U for element 2 would be equal to (NEXT U for element 1) plus C, or C times 2.

NEXT U is then compared to the temporary X coordinate (derived from the X-Y coordinate position of the previous adjacent element) initially assigned to the next element. If, as stated above, NEXT U is greater than or equal to the temporary X coordinate, then the temporary X coordinate will be incremented by one and a new memory position will be created for that component of that element.

In accordance with step 120, the V coordinate position of the next adjacent element can be determined according to the following equation:

NEXT $V$=LAST $V+S$ where NEXT V will be the V coordinate position for that element and LAST V is the V coordinate position of the previous element. Assuming the U-V coordinate position of element 0 is (0,0), then NEXT V for element 1 would be equal to S, or S times 1 (the number of the element in the detector array for which NEXT V is being determined.) Likewise, NEXT V for element 2 would be equal to (NEXT V for element 1) plus S, or S times 2.

NEXT V is then compared to the temporary Y coordinate (derived from the X-Y coordinate position of the previous adjacent element) initially assigned to the next element. If, as stated above, NEXT V is greater than or equal to the temporary Y coordinate, then the temporary Y coordinate will be incremented by one and a new memory position will be created for that component of that element. When the temporary X-Y coordinate positions for an element have been determined, pixel data is read from the detector element and stored in the memory address corresponding to the temporary X-Y coordinate position.

Figure 9:
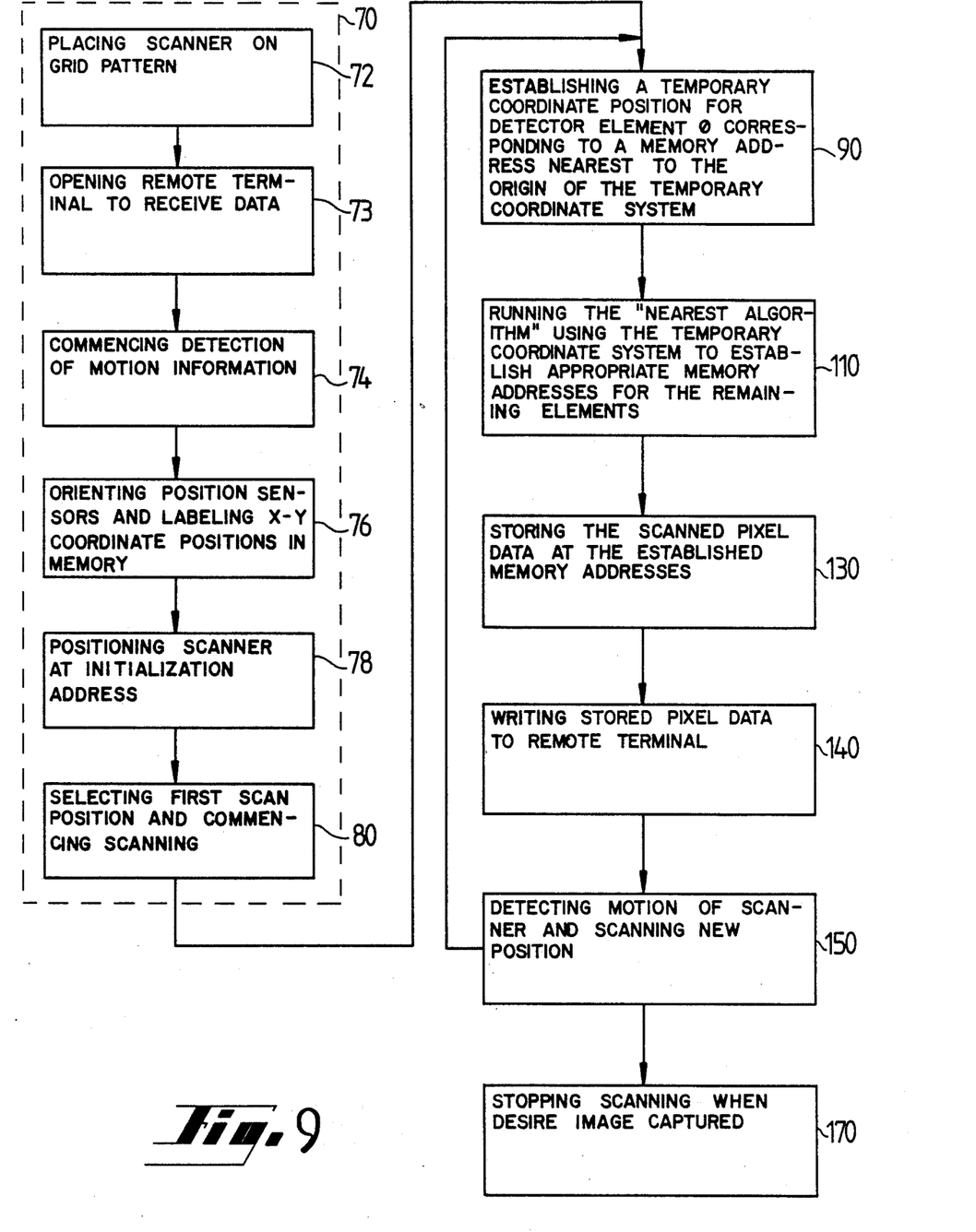
FIG. 9 is a flow diagram illustrating the process illustrated in FIG. 3 and further including the process of writing stored pixel data to a remote terminal.

A flow diagram illustrating the process depicted in FIG. 3 and further including the process of writing stored pixel data to a remote terminal is illustrated in FIG. 9. FIG. 9 is substantially similar to FIG. 3 except that after the scanner has been placed on the grid pattern in step 72 of step 70, a signal from either the computer or a manual switch on the scanner is sent to a remote terminal, such as a printer or video display terminal (VDT), and thereby enabling the remote terminal to receive information being transmitted to the memory of the computer. Another step, step 140, is also added after step 130, which directs that pixel data and memory address information input to the memory be written to the remote terminal as well, so that visual display of the scanning of the image can be monitored during a scan.

Figure 10:
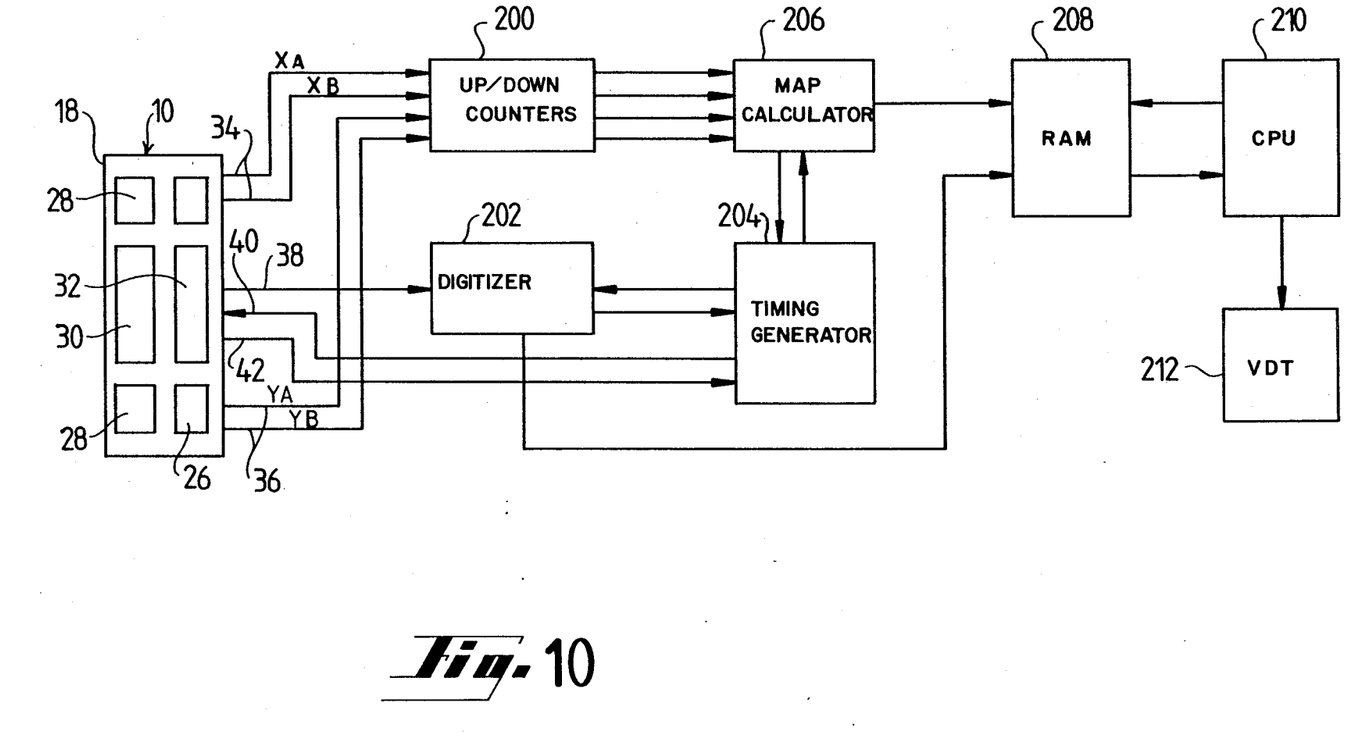
FIG. 10 is a block diagram schematically representing an arrangement of component parts which could be used in the practice of the present invention.

FIG. 10 is block diagram schematically representing an arrangement of component parts which could be used in the practice of the present invention. Scanner 10 is shown with housing 18, position sensors 28 and detector array 32. Communication wires 34 and 36 communicate scanner motion and position information signals, in the form of quadrature signals XA, XB, YA and YB, respectively, to up/down counters 200, which keep track of the position of both mice as they are moved across the grid pattern. Data line 38 communicates scanned pixel data in analog signal form to a digitizer 202, which prepares the pixel data for storage in memory. Timing line 40 provides timing synchronization from timing generator 204 to the scanner so that the steps to the process illustrated above are carried out in properly timed sequence. End of signal line 42 communicates with timing generator 204 to indicate when a timing command communicated over timing line 40 has been completed.

Timing generator 204 also communicates with digitizer 202 and map calculator 206, which receives position information from up/down counters 200 and determines the memory addresses for scanned pixel data to be recorded in RAM (random access memory) 208. Although elements 200, 202, 204 and 206 are shown in hardware form, these elements may be substituted by a software embodiment capable of accomplishing the same results. Scanned data is communicated through digitizer 202 to RAM 208 where it is stored in memory addresses corresponding to the temporary X-Y coordinate positions or X-Y coordinate positions determined in accordance with the process described above and under the control of the CPU (central processing unit) 210. A VDT (video display terminal) 212 or other type of remote terminal may also be connected to CPU to receive and display the scanned image.

Once a memory address in RAM 208 has been assigned some value representing the amount of light detected by a detector element, that memory address will normally be over-written each time a new scanning session takes place, although this need not necessarily always be the case.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for using a scanner to scan pixel data from an image on a page and map said scanned pixel data into a memory of a computer having memory addresses corresponding to discrete X-Y coordinate positions of said page, said scanner having an elongated detector array including detector elements 0 through $N-1$ for detecting pixel data from said page and communicating said pixel data to said computer, a first position sensor separated a first predetermined distance from detector element 0 for detecting and communicating first position information to said computer, and a second position sensor separated a second predetermined distance from said first position sensor for detecting and communicating second position information to said computer, comprising the steps of:

(a) placing said scanner over said page;
(b) commencing detection of said first and second position information by said first and second position sensors and communicating said first and second position information to said computer;
(c) determining the orientation of said scanner with respect to said coordinate positions using said first and second position information;
(d) moving said scanner to a selected first position on said page from which it is desired to commence scanning;
(e) commencing pixel data detection by said detector elements;
(f) moving said scanner over the image to be scanned;
(g) communicating said pixel data output by said detector elements to said computer; and
(h) using said first and second position information to determine memory addresses for storing said pixel data, each said memory address corresponding to a discrete X-Y coordinate position on said page, the pixel data output by a particular detector element, being stored at a memory address corresponding to a coordinate position which is nearest the position of said particular detector element.

2. A method for using a scanner to scan pixel data from an image on a page as recited in claim 1 wherein said page is covered by a transparency having indicia of position forming an orthogonal array of intersecting rows and columns, centers of the intersections of said rows and columns defining said discrete X-Y coordinate positions, said first and second position sensors optically detecting said indicia of position.

3. A method for using a scanner to scan pixel data from an image on a page as recited in claim 1 wherein the step of using said first and second position information to determine said memory addresses comprises the steps of:

converting said X-Y coordinate positions to temporary X-Y coordinate positions for a temporary coordinate system having an origin at detector element 0;

placing the origin of a U-V coordinate system having a U-axis about parallel to said X-axis and a V-axis about parallel to said Y-axis at about the X-Y coordinate position of element 0;

storing the pixel data output by detector element 0 at a first memory address;

determining a next memory address which corresponds to an X-Y coordinate position nearest the position of a next detector element and at which to store pixel data output by said next detector element by determining a next U-V coordinate position corresponding to said next detector element, comparing the U-axis component of said next detector element to a preceding temporary X-axis component of a preceding adjacent detector element and incrementing said temporary X-axis component to create a next temporary X-axis component if said next U-axis component is greater than or equal to said preceding temporary X-axis component, and comparing the V-axis component of said next detector element to the preceding temporary Y-axis component of said preceding adjacent detector element and incrementing said temporary Y-axis component to create a next temporary Y-axis component if said next V-axis component is greater than or equal to said preceding temporary Y-axis component;

storing pixel data output by said next adjacent detector element at said next memory address;

repeating the steps of determining said next memory address and storing pixel data therein for each detector element in said detector array.

4. A method for using a scanner to scan pixel data from an image on a page as recited in claim 3 wherein the step of determining said next U-V coordinate position includes the steps of:

calculating a next U coordinate position according to the equation NEXT $U=$ LAST $U+C$, where NEXT U is said next U coordinate position, LAST U is the U coordinate position assigned to said preceding adjacent detector element, and C is the cosine of the angle formed by said detector array with the X-axis; and calculating a next V coordinate position according to the equation NEXT $V=$ LAST $V+S$, where NEXT V is said next V coordinate position, LAST V is the V coordinate position assigned to said preceding adjacent detector element, and S is the sine of said angle formed by said detector array with the X-axis.

5. A method for using a scanner to scan pixel data from an image on a page as recited in claim 4, wherein said step of determining said next U-V coordinate further includes the steps of:

determining the X-Y coordinate positions of said detector elements 0 and $N-1$, the X-Y coordinate position of detector element 0 being labeled (X1,Y1), and the X-Y coordinate position of detector element $N-1$ being labeled (X2,Y2);

calculating the distance, DX, from detector element 0 to detector element $N-1$ along the X-axis according to the equation $DX=|X2-X1|$;

calculating the distance, DY, from detector element 0 to detector element $N-1$ along the Y-axis according to the equation $DY=|Y2-Y1|$;

calculating said sine of said angle formed by said detector array with said X-axis according to the equation $$S = \frac{DX}{\text{sqrt}(DX^2 + DY^2)}$$

where S is the sine of said angle; and
calculating said cosine of said angle formed by said detector array with said X-axis according to the equation $$C = \frac{DY}{\text{sqrt}(DX^2 + DY^2)}$$

where C is the cosine of said angle.

6. A method for using a scanner to scan pixel data from an image on a page as recited in claim 3 wherein the origin of said U-V coordinate system is placed within one-half of a coordinate position of said detector element 0 in either the X-axis direction, the Y-axis direction, or both the X and Y-axis direction.

7. A method for using a scanner to scan pixel data from an image on a page as recited in claim 3 wherein said temporary X-Y coordinate positions and said U-V coordinate positions are limited to being expressed in integers.

8. A method for using a scanner to scan pixel data from an image on a page as recited in claim 1 wherein said detector elements detect said pixel data at a predetermined periodic rate.

9. A method for using a scanner to scan pixel data from an image on a page as recited in claim 1 wherein said detector elements are only operative to detect said pixel data after said first position sensor or said second position sensor detects said first and second position information.

10. A method for using a scanner to scan pixel data from an image on a page as recited in claim 1 and further comprising the steps of:
  initializing a remote terminal for displaying said scanned image to receive said pixel data and a display address output by said computer, said display address being operative to instruct said terminal where to place said pixel data in the output of said terminal;
  converting said memory addresses to said display addresses after storing said pixel data in said memory; and
  communicating said pixel data and said display addresses to said terminal for display thereby.

11. A method for using a scanner to scan pixel data from an image on a page as recited in claim 10 wherein the step of using said first and second position information to determine said memory addresses comprises the steps of:
  converting said X-Y coordinate positions to temporary X-Y coordinate positions for a temporary coordinate system having an origin at detector element 0;
  placing the origin of a U-V coordinate system having a U-axis about parallel to said X-axis and a V-axis about parallel to said Y-axis at about the X-Y coordinate position of element 0;
  storing the pixel data output by detector element 0 at a first memory address;
  determining a next memory address which corresponds to an X-Y coordinate position nearest the position of a next detector element and at which to store pixel data output by said next detector element by determining a next U-V coordinate position corresponding to said next detector element, comparing the U-axis component of said next detector element to a preceding temporary X-axis component of a preceding adjacent detector element and incrementing said temporary X-axis component to create a next temporary X-axis component if said next U-axis component is greater than or equal to said preceding temporary X-axis component, and comparing the V-axis component of said next detector element to the preceding temporary Y-axis component of said preceding adjacent detector element and incrementing said temporary Y-axis component to create a next temporary Y-axis component if said next V-axis component is greater than or equal to said preceding temporary Y-axis component;
  storing pixel data output by said next adjacent detector element at said next memory address;
  repeating the steps of determining said next memory address and storing pixel data therein for each detector element in said detector array.

12. A method for using a scanner to scan pixel data from an image on a page covered by a transparency having indicia of position forming an orthogonal array of rows and columns of pixels with centers having X-Y coordinate positions, storing the scanned pixel data in a memory of a computer having memory addresses corresponding to the X-Y coordinate positions, and displaying said stored pixel data as an output of a display device in communication with said computer, said scanner having an elongated detector array including detector elements 0 through N−1 for detecting pixel data from said page and communicating said pixel data to said computer, a first position sensor separated a first predetermined distance from detector element 0 for detecting said indicia and communicating first indicia detection information to said computer, and a second position sensor separated a second predetermined distance from said first position sensor for detecting said indicia and communicating second indicia detection information to said computer, comprising the steps of:
  (a) placing said scanner on said transparency;
  (b) commencing detection of said indicia by said position sensors and communicating said first and second information to said computer;
  (c) determining the orientation of said scanner with respect to said orthogonal array using said first and second information;
  (d) positioning said scanner over a location on said transparency which can be identified as an initialization address within said memory;
  (e) moving said scanner to a selected first position on said orthogonal array from which it is desired to commence scanning;
  (f) initializing said display device to receive said stored pixel data and a display address output by said computer, said display address being operative to instruct said display device where to place said stored pixel data in the output of said display device;
  (g) commencing pixel data detection by said detector elements;
  (h) moving said scanner over the surface of said transparency overlaying the image to be scanned;
  (i) communicating said pixel data output by said detector elements to said computer;

(j) using said first and second information to determine memory addresses for storing said pixel data, each said memory address corresponding to a location on said transparency, and to determine said display addresses corresponding to the location of each pixel of said image; and (k) communicating said display addresses and said stored pixel data to said display device for display thereby.

13. A method for using a scanner to scan pixel data from an image on a page as recited on claim 12, wherein said pixel data output by a particular detector element is stored at a nearest memory address in said memory corresponding to a location on said transparency which is nearest the position of said particular detector element.

14. A method for using a scanner to scan pixel data from an image on a page as recited in claim 12 wherein the step of using said first and second information to determine said memory addresses comprises the steps of:

converting said X-Y coordinate positions to temporary X-Y coordinate positions for a temporary coordinate system having an origin at detector element 0;

placing the origin of a U-V coordinate system having a U-axis about parallel to said X-axis and a V-axis about parallel to said Y-axis at about the X-Y coordinate position of element 0;

storing the pixel data output by detector element 0 at a first memory address;

determining a next memory address which corresponds to an X-Y coordinate position nearest the position of a next detector element and at which to store pixel data output by said next detector element by determining a next U-V coordinate position corresponding to said next detector element, comparing the U-axis component of said next detector element to a preceding temporary X-axis component of a preceding adjacent detector element and incrementing said temporary X-axis component to create a next temporary X-axis component if said next U-axis component is greater than or equal to said preceding temporary X-axis component, and comparing the V-axis component of said next detector element to the preceding temporary Y-axis component of said preceding adjacent detector element and incrementing said temporary Y-axis component to create a next temporary Y-axis component if said next V-axis component is greater than or equal to said preceding temporary Y-axis component;

storing pixel data output by said next adjacent detector element at said next memory address; and repeating the steps of determining said next memory address and storing pixel data therein for each detector element in said detector array.

15. A method for using a scanner to scan pixel data from an image on a page as recited in claim 14 wherein the step of determining said next U-V coordinate position includes the steps of:

calculating a next U coordinate position according to the equation NEXT $U=$ LAST $U+C$, where NEXT U is said next U coordinate position, LAST U is the U coordinate position assigned to said preceding adjacent detector element, and C is the cosine of the angle formed by said detector array with the X-axis; and calculating a next V coordinate position according to the equation NEXT $V=$ LAST $V+S$, where NEXT V is said next V coordinate position, LAST V is the V coordinate position assigned to said preceding adjacent detector element, and S is the sine of said angle formed by said detector array with the X-axis.

16. A method for using a scanner to scan pixel data from an image on a page as recited in claim 15, wherein said step of determining said next U-V coordinate position further includes the steps of:

determining the X-Y coordinate positions of said detector elements 0 and N−1, the X-Y coordinate position of detector element 0 being labeled (X1,Y1), and the X-Y coordinate position of detector element N−1 being labeled (X2,Y2);

calculating the distance, DX, from detector element 0 to detector element N−1 along the X-axis according to the equation $DX=|X2-X1|$;

calculating the distance, DY, from detector element 0 to detector element N−1 along the Y-axis according to the equation $DY=|Y2-Y1|$;

calculating said sine of said angle formed by said detector array with said X-axis according to the equation $$S = \frac{DX}{\text{sqrt}(DX^2 + DY^2)}$$

where S is the sine of said angle; and calculating said cosine of said angle formed by said detector array with said X-axis according to the equation $$C = \frac{DY}{\text{sqrt}(DX^2 + DY^2)}$$

where C is the cosine of said angle.

17. A method for using a scanner to scan pixel data from an image on a page as recited in claim 14 wherein the origin of said U-V coordinate system is placed within one-half of a coordinate position of said detector element 0 in either the X-axis direction, the Y-axis direction, or both the X and Y-axis direction.

18. A method for using a scanner to scan pixel data from an image on a page as recited in claim 14 wherein said temporary X-Y coordinate positions and said U-V coordinate positions are limited to being expressed in integers.

19. A method for using a scanner to scan pixel data from an image on a page as recited in claim 12 wherein said detector elements detect said pixel data at a predetermined periodic rate.

20. A method for using a scanner to scan pixel data from an image on a page as recited in claim 12 wherein said detector elements are only operative to detect said pixel data after said first position sensor or said second position sensor detects said indicia.

* * * * *